Dec. 6, 1955   M. DI PETTO   2,725,761
DRIVING MECHANISM FOR AUTOMOTIVE VEHICLES
Filed June 15, 1953   2 Sheets-Sheet 2
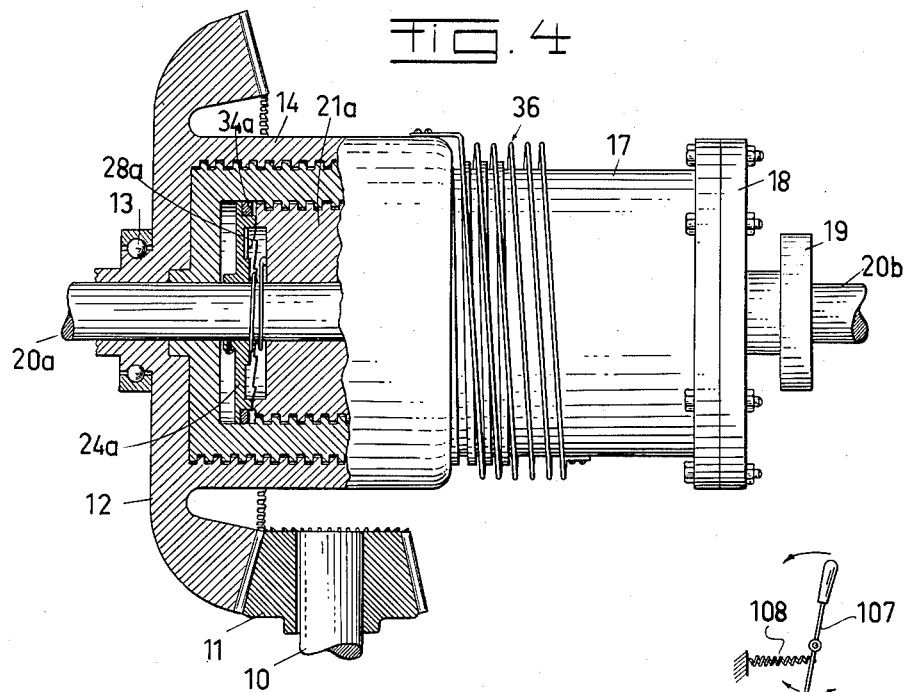
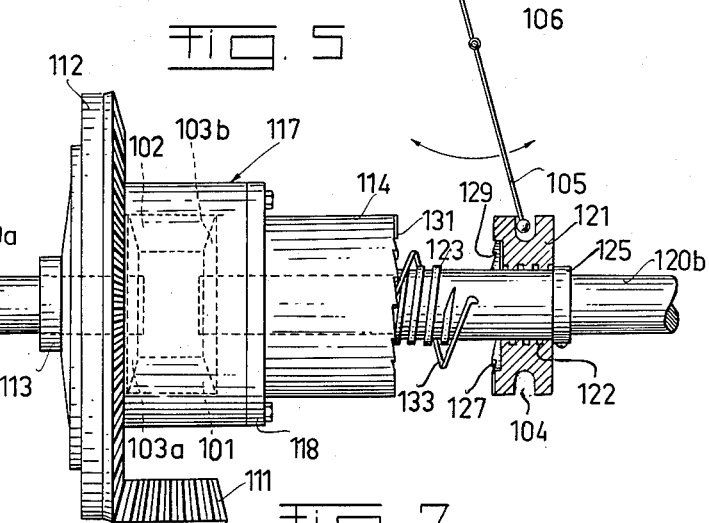
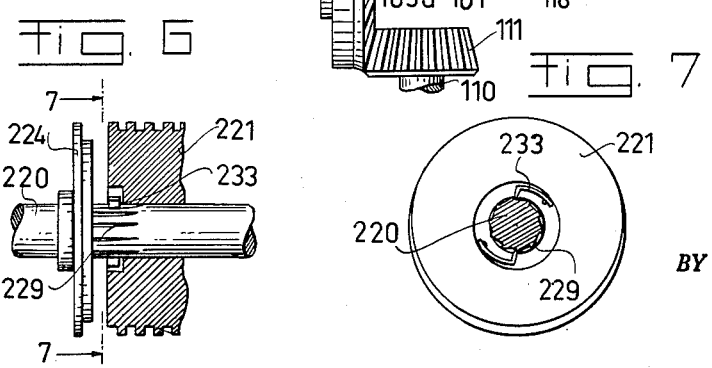
MARIO DiPETTO
INVENTOR.
BY Karl F. Ross
AGENT

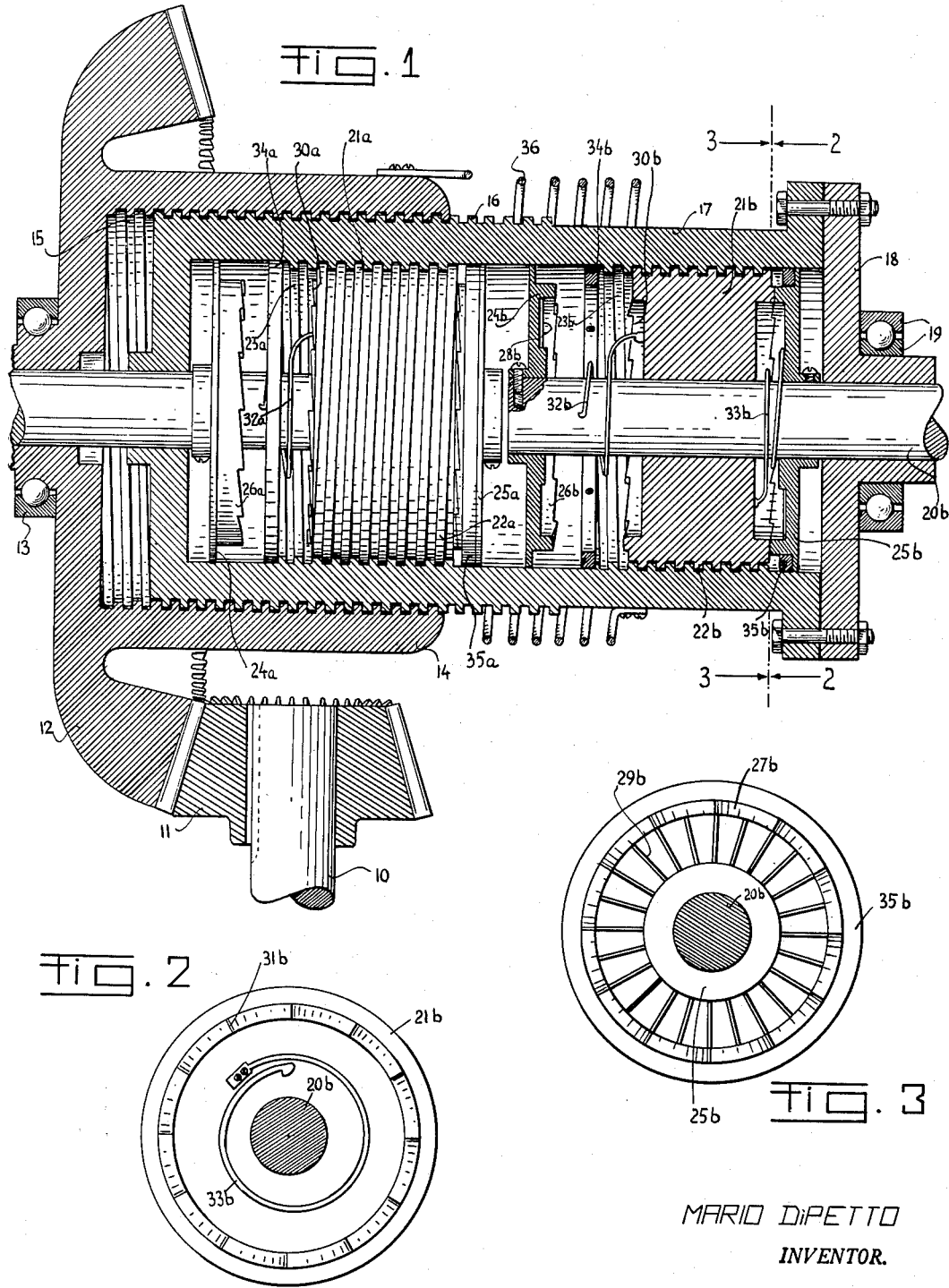

United States Patent Office 2,725,761
Patented Dec. 6, 1955

1

2,725,761

DRIVING MECHANISM FOR AUTOMOTIVE VEHICLES

Mario Di Petto, New York, N. Y., assignor of two-thirds to Karl F. Ross, Bronx, N. Y.

Application June 15, 1953, Serial No. 361,727

19 Claims. (Cl. 74—650)

My present invention relates to a driving mechanism for automotive vehicles, more particularly to mechanism for transmitting power from a motor to the driven wheels (usually the rear wheels) of a vehicle having at least two such driven wheels.

The conventional transmission in vehicles of this character includes a differential gear whose purpose it is to enable division of the motor torque in different ratios between the two driven wheels, whereby the same are adapted to rotate at unequal speeds when the vehicle goes through a curve. A serious drawback of the usual type of differential, however, resides in its inability to transmit power to one of the wheels if the other wheel happens to lose traction, as by coming to rest on a virtually frictionless surface, such as an ice patch or swampy ground. When this occurs, the vehicle is stalled and requires outside power or elaborate traction-increasing operations to set it in motion again.

Various modifications of the conventional differential have already been proposed for the purpose of overcoming the drawback referred to; these attempted improvements, however, usually manifest one or more of the following disadvantages:

(a) undue complexity of construction;
(b) difficult manual or not fully reliable automatic operation;
(c) excessive strain on parts under certain operating conditions;
(d) inability of the system to function in both the forward and the reverse direction; and
(e) undesirable decoupling between engine and wheel assembly, permitting the vehicle to "run away" on downgrades and to lose the braking effect of the motor.

The general object of my invention is to provide a transmission mechanism for the purpose set forth which will avoid all the disadvantages enumerated above.

A more particular object of my invention is to provide means for selectively establishing and removing a positive coupling, under different operating conditions, between either or both driven wheels and the engine, so as always to afford the most suitable kind of power transmission.

Still another object of my invention is to provide a selectively engageable coupling means, as set forth above, adapted to operate with a minimum of impact and wear.

A feature of my invention resides in a sleeve member rotatably and slidably mounted on a wheel axle next to or within an axle housing and preferably provided with screw threads forming part of a camming mechanism by means of which relative rotation between the sleeve and the axle will result in an axial displacement of the sleeve toward an abutment which, in preventing further axial displacement, positively couples the axle housing, the sleeve and the wheel axle together for simultaneous rotation. If the abutment is fixed to the axle, then the housing may comprise screw threads co-operating with those of the sleeve as part of the cam-

2 ming mechanism; a unidirectional detent member effective over a limited range of axial positions of the sleeve, such as an axially compressible coil spring, is inserted between the abutment and the sleeve and is normally disconnected from at least one of these elements but adapted to be engaged thereby upon relative rotation thereof in a predetermined sense, thus helping to draw the sleeve toward the abutment and to establish the aforesaid positive coupling thereof. The arrangement just described may, however, be reversed to fix the abutment to the housing and to provide the axle with the co-operating screw threads. Moreover, the sleeve and the abutment are preferably provided with teeth or similar mating formations to relieve the flexible detent member of tensile stresses in the operative transfer of power between the housing and the wheel axle.

The above and other objects and features of my invention will be more fully understood from the following description of various embodiments, reference being had to the accompanying drawing in which:

Fig. 1 is an axial cross-section through an axle housing forming part of a fully automatic transmission mechanism according to my invention;

Figs. 2 and 3 are transverse sections (with the housing removed) on the lines 2—2 and 3—3, respectively, of Fig. 1;

Fig. 4 shows the housing of Fig. 1 partly in elevational view and partly in section, with the mechanism in an alternative operating position;

Fig. 5 is an elevational view of a manually controllable transmission mechanism according to my invention;

Fig. 6 is a detail view illustrating a modification; and

Fig. 7 is a section on the line 7—7 of Fig. 6.

Reference will first be made to the fully automatic system illustrated in Figs. 1–4. Figs. 1 and 4 show the usual propeller shaft 10 carrying the beveled pinion 11 which mates with the ring gear 12, the latter being mounted in axially fixed position in a bearing 13. The gear 12 has a large integral hub 14, internally threaded at 15, which matingly receives the screw threads 16 of an axle housing 17. The housing 17 is in the form of a cylinder whose end remote from the gear 12 is closed by a plate 18 having a hub keyed to the inner one of a pair of concentric bearing rings 19 so that the housing will be free to move, under certain conditions, between an extreme right-hand position (Fig. 1) and an extreme left-hand position (Fig. 4).

Shown at 20a and 20b are the two driven axles of a vehicle whose motor (not shown) drives the propeller shaft 10. For purposes of the subsequent discussion it will be assumed that the shaft 10 extends towards the front of the vehicle and that, therefore, clockwise rotation of axle 20b, as viewed in Fig. 3, corresponds to a forward movement of the vehicle. The axles 20a, 20b are held in axially fixed positions by means (not shown).

The interior of the housing 17 is subdivided into two substantially identical halves, one for each axle, corresponding elements of which are distinguished by the postscripts "a" and "b," respectively. In the description immediately following it will, therefore, suffice to recite specifically the elements contained in the right-hand half of the housing, associated with the axle 20b; reference to the elements associated with the axle 20a will be made, however, in the subsequent explanation of the operation of my invention.

A sleeve member 21b is freely rotatable on the axle 20b and carries screw threads 22b matingly engaging threads 23b on the inner periphery of the right-hand portion of housing 17. Fixed to the axle 20b, on either side of the sleeve member 21b, are a pair of disks 24b, 25b whose faces directed toward this sleeve member 21b carry a projecting ring of sawteeth 26b, 27b, respectively, and, in recesses within these rings, a set of additional sawteeth 28b, 29b, respectively. The sleeve member 21b is similarly provided with sawteeth 30b, 31b facing the sawteeth 26b, 27b, respectively. Anchored to the sleeve member 21b in recesses within the sawteeth rings 30b, 31b are a pair of short coil springs 32b, 33b whose free ends are provided with prongs adapted to hook onto the sawteeth 28b, 29b, respectively. A pair of annular abutment members 34b, 35b, inserted between the sleeve member 21b and the disks 24b, 25b, respectively, are receivable in peripheral recesses of these disks and are adapted to form backstops for the sleeve member 21b by engaging respective face portions thereof externally of the teeth 30b and 31b.

A coil spring 36, anchored to the hub 14 and to the housing 17, tends to keep the latter in an axial position with respect to the axles 20a, 20b which is intermediate the two extreme positions shown in Figs. 1 and 4, respectively. It it to be noted that the distance between these two positions is substantially equal to the play afforded by the abutment rings 34b and 35b contacting the disk 24b and 25b, respectively, whereby the rings 35a, 35b will be received in the peripheral recesses of disks 25a, 25b in the position of Fig. 1 whereas the rings 34a, 34b will be received in the peripheral recesses of disks 24a, 24b in the position of Fig. 4. It should further be understood that in the position of Fig. 1 the abutment ring 34b prevents the sleeve member 21b from assuming a position in which the prong of its spring 32b could engage the teeth 28b of disk 24b, and that in the position of Fig. 4 the abutment ring 35b prevents this sleeve member from assuming a position in which the prong of its spring 33b could engage the ratchet teeth 29b of disk 25b; the same relationship exists, of course, between sleeve member 21a, disks 24a, 25a and rings 34a, 35a.

With the above relationship clearly in mind it will now be possible to explain the operation of the system of my invention under a variety of typical driving conditions.

(a) Forward drive

This condition is characterized by the application of driving power from the motor via shaft 10 to the housing 17 and, thence, to the axles 20a, 20b; it is equivalent to a condition of start or acceleration. When this occurs, the hub 14 of gear 12 tends frictionally to rotate the housing 17 and, by the camming action of threads 15, 16 to shift the housing 17 toward the right, as viewed in Figs. 1 and 4, thus into the extreme axial position of Fig. 1. Since this shift is opposed by the spring 36, the housing may rotate momentarily in its intermediate axial position, thereby exerting a similar rotating and camming effect upon the sleeve members 21a, 21b therewithin. The tendency of the threads 22a, 22b and 23a, 23b will be to shift these sleeve members to the right, against the compressive strength of spring 33b and its companion spring (not shown) associated with sleeve member 21a. The prongs of these springs, however, catch onto the inner teeth, such as 29b, of the disks 25a, 25b, thereby preventing further rotation of the sleeve members and forcing them toward the right where the facial teeth, such as 27b, 31b, of the sleeve members 21a, 21b and of the disks 25a, 25b intermesh and positively couple the sleeve members with the shafts 20a, 20b. The resulting drag opposes the rotation of axle housing 17 and causes it to shift entirely over into the right-hand extreme position of Fig. 1.

If, now, the driver of the vehicle wishes to make a right turn, the axle 20b will rotate faster than the housing 17 by virtue of a slippage between the sawteeth 27b and 31b while power continues to be applied from the housing 17 to the axle 20a; conversely, in the case of a left turn, the disk 25a and, with it, the axle 20a will be able to rotate faster than the sleeve 21a entrained by the housing 17. At the same time, however, the abutments 34a, 34b in their extreme right-hand positions will positively prevent any jamming due to possible leftward displacement of the sleeve member of the momentarily faster-spinning axle 20a or 20b and engagement of its left-hand spring 32a or 32b with the inner teeth of the disk 24a or 24b, respectively.

(b) Coasting forward drive

This condition is characterized by a tendency of the axles 20a, 20b to rotate faster than the housing 17 and is equivalent to a condition of engine-braking or deceleration. The situation previously described will now be reversed and, by an analogous process, the sleeve members 21a, 21b as well as the housing 17 will be urged into their extreme left-hand positions, as illustrated in Fig. 4. On a straight course, positive coupling between the sleeve members 21a, 21b and the disks 24a, 24b will take place by virtue of their mating teeth, such as 26a and 30a. When the driver makes a right turn, slippage between teeth 26a and 30a will enable the inner, slower shaft 20a to lag behind the sleeve 21a and the housing 17; on a left turn, disk 24b will be similarly decoupled from the sleeve 21b. Untimely engagement between the right-hand springs, such as 33b, and the teeth of disks 25a, 25b will be prevented by the abutments 35a and 35b, respectively.

(c) Rearward drive

The situation here will be identical with that described under (b), supra, as long as the vehicle moves on a straight course. When the driver goes into a turn (e. g. to the right), slippage will take place between the outer, faster axle (e. g. 20b) and the housing, in contradistinction to the case previously described.

(d) Downhill rearward drive

This situation is identical with that set forth under (a), supra, with the distinction that the inner, slower axle will be decoupled from the housing in a curve.

It will be appreciated that the four situations discussed above are representative of all normal driving conditions, yet there may further occur a transitory condition in which the axles 20a, 20b, the housing 17 and the gear 12 all rotate at precisely the same speed and the sleeves 21a, 21b are centered within the housing which, in turn, occupies an intermediate position between those shown in Figs. 1 and 4. In this transitory condition, all four coil springs such as 32a, 32b, 33b engage the inner teeth, such as 28a, 28b, 29b, of the four disks 24a, 24b and 25a, 25b, respectively, with the result that any change in engine or vehicle speed will cause the sleeve members 21a, 21b to move in one direction or the other, whereupon the parts will assume one of the typical relative positions previously set forth.

In Fig. 5 I have shown a modified arrangement embodying principles of my invention in a manually operable system for positively locking the axles 120a, 120b to the housing 117 of a conventional differential gear, the latter comprising the usual bevel wheels 101, 102 within the housing, and, in meshing relationship therewith, the bevel wheels 103a, 103b fixed to the axles 120a, 120b, respectively. The ring gear 112, which is rigid with the housing 117, is driven from propeller shaft 110 by pinion 111 and is mounted in axially fixed position in a bearing 113.

The cover plate 118 of the housing 117 is provided with a hub 114 carrying a ring of sawteeth 131 on its outer face and having anchored to it a coil spring 133; mating sawteeth 127 are provided on a face of a sleeve member 121 which is threaded internally at 122 to mate with similar threads 123 on the shaft 120b. A set of inner teeth 129, positioned within a recess of the sleeve 121, are engageable by the pronged free end of coil spring 133.

The sleeve member 121 is provided with a peripheral groove 104 engaged by an extremity of an arm 105 controlled, via a linkage 106, by a manually operable lever 107. The sleeve member 121 is normally maintained in an extreme right-hand position, as shown, in which it rests against an abutment 125 on the shaft 120b; its threads 122 are in this position, as shown, clear of the threads 123 which only extend over a portion of the shaft 120b.

The system of Fig. 5 will perform in the manner of a conventional differential as long as the control lever 107 is unoperated. Let us assume, however, that the vehicle is immobilized by reason of the fact that the right-hand rear wheel, mounted on the axle 120a, has lost traction and the axle 120b receives no power from the differential. With the assembly 112, 117, 114, spinning in a forward direction, the driver displaces the lever 107 to the left (arrow) so as to cause the sleeve member 121 to move likewise to the left; when the latter movement has progressed far enough, the spring 133 will engage one of the sawteeth 129 and will rotatively entrain the sleeve 121, whereupon further leftward movement of the latter will cause its threads 122 to mate with the threads 123 of the stationary axle 120b. The sleeve member 121 will now be cammed still further toward the left, compressing the spring 133, until the teeth 127 and 131 intermesh and further axial shifting of the sleeve member is prevented, whereby the rotation of the hub 114 will be communicated to the axle 120b. After the wheel on axle 120a has regained traction, the driver by making a right-hand turn may cause the axle 120b to rotate faster than the hub 114, whereupon the sleeve member 121 will be urged toward the right and the threads 122, 123 will be disengaged, allowing restoration to normal position either manually or by suitable resetting means, such as spring 108.

It will be readily appreciated that a similar coupling mechanism with mirror-symmetrical threads may be provided on the axle 120a, to become effective in the event the latter axle becomes immobilized; this, however, is not indispensable since the mechanism shown in Fig. 5 may be utilized under such circumstances, by energizing the differential housing 117 in the reverse direction and pulling the lever 107 until the threads 123 on the rotating axle 120b have engaged the threads 122 on sleeve 121 and have cammed the latter into contact with the hub 114, thereby slowing down the axle 120b with respect to housing 117 and causing the transfer of power to axle 120a.

The function of the coil springs 32a etc. is primarily that of serving as a coupling link for unidirectional rotation effective over a limited range of relative axial positions between the sleeve members 21a, 21b and the axles 20a, 20b and that, therefore, they may be replaced by other (not necessarily compressible) limited-range coupling means such as, for example overrunning-clutch mechanisms or pawl-and-ratchet arrangements carried on overlapping portions of telescoped members which are rigid with the sleeve members and with the disks 24a etc., respectively. This is illustrated in Figs. 6 and 7 where portions of the axle 220 and of the sleeve 221 constitute, themselves, the telescoped members referred to and are provided with ratchet teeth 229 and pawls 233 adapted to interengage in a range of axial positions of the sleeve 221 in which the same is relatively close to but not necessarily in contact with the abutment disk 224 carried on the axle 220. At the same time it may be pointed out that the spring coupling shown in Figs. 1–5 has the additional advantage of effecting a gradual, virtually impactless engagement between the wheel axles and the housing by virtue of a progressive reduction of their relative motion as the springs take effect; also, the resiliency of the axially compressible springs aids in restoring the sleeve members to a neutral, intermediate position upon the occurrence of any change in driving conditions.

Other departures from the details of construction shown in the embodiments herein disclosed are, of course, possible within the spirit and scope of the invention as defined in the appended claims. Thus, it need hardly be mentioned that the shafts 20a, 20b need not be the wheel axles themselves but may be coupled thereto by any suitable transmission means. Also, it should be noted that correlative terms, such as "forward" and "backward" or "right" and "left," as used in the claims, are to be interpreted in a relative sense only and not as absolute physical limitations.

I claim:

1. In an automotive transmission system, in combination, a pair of concentric, relatively rotatable elements, a driven shaft rigid with one of said elements, a source of motive power operatively connected with the other of said elements, and coupling means between said elements including a member concentric with and rotatable as well as slidable with respect to said elements, cam means on said member, co-operating cam means on a first one of said elements tending to shift said member toward an extreme axial position upon relative rotation of said member and said first one of said elements in a predetermined sense, mounting means limiting the relative axial displacement of said elements, abutment means on a second one of said elements engageable by said member in said extreme axial position thereof, thereby coupling said member and said elements together for simultaneous unidirectional rotation, and compressible link means between said member and said abutment means forming a unidirectional coupling therebetween, said link means bridging the gap between said member and said abutment means over a limited range of relative axial positions thereof and impeding unidirectional relative rotation therebetween while in said range of axial positions.

2. The combination according to claim 1, including co-operating surface formations on said member and on said abutment means, said formations unidirectionally preventing relative rotation of said member and of said abutment means in said extreme axial position.

3. The combination according to claim 1, including control means for selectively engaging said cam means on said member with said co-operating cam means.

4. In an automotive transmission system, in combination, a pair of concentric, relatively rotatable elements, a driven shaft rigid with one of said elements, a source of motive power operatively connected with the other of said elements, and coupling means between said elements including a sleeve member rotatable and slidably mounted on the inner and within the outer of said elements, screw threads on said member, co-operating screw threads on a first one of said elements tending to displace said member between two extreme axial positions upon relative rotation of said member and said first one of said elements in either sense, mounting means limiting the relative axial displacement of said elements, first abutment means on a second one of said elements engageable by said member in one of said extreme axial positions, and second abutment means on said second one of said elements engageable by said member in the other of said extreme axial positions, thereby coupling said member and said elements together for simultaneous unidirectional rotation in respective directions.

5. The combination according to claim 4, including first compressible link means inserted between said member and said first abutment means and bridging the gap therebetween in any relative axial position thereof between an intermediate axial position and said one of said extreme axial positions, and second compressible link means inserted between said member and said second abutment means and bridging the gap therebetween in any relative axial position thereof between an intermediate axial position and said other of said extreme axial positions, each of said link means forming a unidirectional coupling between said member and the respective abutment means which, by impeding relative rotation therebetween in a predetermined sense, enhances the effectiveness of said threads in shifting said member toward either of said extreme axial positions.

6. The combination according to claim 5, wherein each of said link means comprises a spring member inserted between adjoining faces of said sleeve member and of the respective abutment means.

7. The combination according to claim 6, wherein at least one of said faces is provided with ratchet teeth, said spring member having a hook-shaped extremity extending toward and engageable with said ratchet teeth.

8. In an automotive transmission system, in combination, a pair of concentric, relatively rotatable elements, a driven shaft rigid with one of said elements, a source of motive power operatively connected with the other of said elements, first coupling means between said elements including a sleeve member rotatably and slidably mounted on the inner and within the outer of said elements, screw threads on said member, co-operating screw threads on said other of said elements, first and second abutment means on said one of said elements flanking said member and defining a first and a second limiting axial position thereof relative to said one of said elements, said screw threads shifting said member toward said first and said second limiting axial position upon rotation of said member relative to said other of said elements in a first and in a second sense, respectively, second coupling means for transmitting a torque between said source of motive power and said other of said elements, said second coupling means including cam means tending to effect axial shifting of said other of said elements toward said first and said second limiting axial position upon entrainment of said other of said elements by said source in said first and in said second sense, respectively, mounting means limiting the axial displacement of said other of said elements relative to said shaft to a range less than the length of axial travel allowed to said member by said first and second abutment means, first link means inserted between said member and said first abutment means operative in certain relative axial positions thereof including said first limiting axial position, second link means inserted between said member and said second abutment means and operative in certain relative axial positions thereof including said second limiting axial position, said first and second link means in their operative state forming a unidirectional coupling between said member and said first and second abutment means, respectively, and, by impeding relative rotation between said member and said one of said elements, enhancing the effectiveness of said screw threads in shifting said member toward the limiting axial position nearest the respective abutment means, and backstop means on said other of said elements holding said member out of operative range of said first and said second link means, respectively, in respective extreme axial positions of said other of said elements.

9. The combination according to claim 8, wherein each of said link means comprises a compressible coil spring.

10. The combination according to claim 8, further including resilient centering means tending to maintain said other of said elements in an intermediate axial position.

11. In an automotive transmission system, in combination, a pair of concentric, relatively rotatable elements, a power-driven member coaxial with said elements and rotatable in a forward and in a backward direction, first coupling means between said elements including a sleeve member rotatably and slidably mounted on the inner and within the outer of said elements, screw threads on said sleeve member, co-operating screw threads on one of said elements, left-hand and right-hand abutment means on the other of said elements flanking said sleeve member and defining a left-hand and a right-hand limiting axial position thereof relative to said other of said elements, said screw threads shifting said sleeve member toward said left-hand and toward said right-hand limiting axial position upon forward and backward rotation, respectively, of said sleeve member relative to said one of said elements, second coupling means between said driven member and the outer of said elements adapted to transmit a torque therebetween and including cam means tending to effect leftward and rightward axial shifting of said outer of said elements in response to application of a forward and a rearward driving torque from said driven member to said outer of said elements, a driven shaft rigid with the inner of said elements, mounting means limiting the axial displacement of said outer of said elements relative to said shaft to a range less than the length of axial travel allowed to said sleeve member by said left-hand and right-hand abutment means, left-hand link means inserted between said sleeve member and said left-hand abutment means and operative in axial positions of said sleeve member to the left of an intermediate position for unidirectionally coupling said sleeve member to said left-hand abutment means in a sense communicating forward rotation of said sleeve member to said shaft, right-hand link means inserted between said sleeve member and said right-hand abutment means and operative in axial positions of said sleeve member to the right of an intermediate position for unidirectionally coupling said sleeve member to said right-hand abutment means in a sense communicating backward rotation of said sleeve member to said shaft, and backstop means on said outer of said elements preventing said sleeve member from reaching the operating range of said left-hand and right-hand link means in an extreme right-hand and left-hand axial position, respectively, of said outer of said elements.

12. The combination according to claim 11, wherein each of said link means comprises a compressible coil spring inserted between adjoining faces of said sleeve member and of the respective abutment means, at least one of said faces being provided with ratchet teeth, said spring having a hook-shaped extremity extending toward and engageable with said ratchet teeth.

13. The combination according to claim 11, wherein each of said link means comprises a pair of telescoped portions rigid with said sleeve member and the respective abutment means, respectively, and providing with unidirectional coupling means effective only in a limited range of relative axial positions of said portions.

14. The combination according to claim 11, wherein said power-driven member is provided with an extension surrounding said outer of said elements, said cam means comprising mating screw threads on said extension and on said outer of said elements.

15. The combination according to claim 11, wherein said second coupling means includes resilient means anchored to said power-driven member and to said outer of said elements, said resilient means tending to maintain said outer of said elements in a neutral position intermediate said extreme axial position thereof.

16. In an automotive transmission system, a combination, a housing; a pair of driven shafts concentric with said housing and extending in opposite directions therefrom; a power-driven member co-axial with said housing and rotatable in a forward and in a backward direction; coupling mechanism between said power-driven member and said housing adapted to transmit a torque therebetween, said mechanism including cam means tending to shift said housing to the left and to the right in response to application of a forward and a rearward driving torque from said driven member to said housing, mounting means limiting the axial displacement of said housing by said cam means and resilient means tending to maintain said housing centered intermediate two extreme axial positions thereof; and respective coupling means between said housing and each of said shafts, each of said coupling means comprising a sleeve member rotatably and slidably mounted on the shaft within said housing, screw threads on said sleeve member, co-operating screw threads on said housing, left-hand and right-hand abutment means on the shaft flanking said sleeve member and defining a left-hand and a right-hand limiting axial position thereof relative to said shaft, said screw threads shifting said sleeve member toward said left-hand and toward said right-hand limiting axial position upon forward and backward rotation, respectively, of said sleeve member relative to said housing, the spacing of said left-hand and right-hand abutment means permitting an axial displacement of said sleeve member greater than the axial displacement of said housing between said extreme positions thereof, left-hand link means inserted between said sleeve member and said left-hand abutment means and operative in axial positions of said sleeve member to the left of an intermediate position for unidirectionally coupling said sleeve member to said left-hand abutment means in a sense communicating forward rotation of said sleeve member to said shaft, right-hand link means inserted between said sleeve member and said right-hand abutment means and operative in axial positions of said sleeve member to the right of an intermediate position for unidirectionally coupling said sleeve member to said right-hand abutment means in a sense communicating backward rotation of said sleeve member to said shaft, and backstop means on said housing preventing said sleeve member reaching the operating range of said left-hand and right-hand link means in the extreme right-hand and left-hand axial position, respectively, of said housing.

17. The combination according to claim 16, wherein both of said link means are simultaneously operative as unidirectional coupling means upon said sleeve member and said housing occupying an intermediate axial position.

18. In an automotive transmission system, in combination, a pair of concentric, relatively rotatable elements, a driven shaft rigid with the inner of said elements, a source of motive power operatively connected with the outer of said elements, and coupling means between said elements including a member concentric with and rotatable as well as slidable with respect to said elements, cam means on said member, cooperating cam means on one of said elements tending to shift said member toward an extreme axial position upon relative rotating of said member and said one of said elements in a predetermined sense, mounting means limiting the relative axial displacement of said elements, abutment means on the other of said elements engageable by said member in said extreme axial position thereof, thereby coupling said member and said elements together for simultaneous unidirectional rotation, link means inserted between said member and said abutment means and operative over a limited range of axial positions of said sleeve member for unidirectionally coupling said sleeve member to said abutment means in the sense of said unidirectional rotation, and mechanism for displacing said sleeve member between positions within and without the operating range of said link means.

19. The combination according to claim 18, further including co-operating surface formations on said member and on said abutment means affording positive unidirectional coupling therebetween in said extreme axial position.

References Cited in the file of this patent

UNITED STATES PATENTS

| | | |
|---|---|---|
| 906,016 | Hedgeland | Dec. 8, 1908 |
| 962,252 | Rockwell | June 21, 1910 |
| 973,031 | Gilbert | Oct. 18, 1910 |
| 1,111,849 | McDonald | Sept. 29, 1914 |
| 1,117,787 | Carlton | Nov. 7, 1914 |
| 1,238,730 | Allen | Sept. 4, 1917 |
| 1,254,540 | Ruden | Jan. 22, 1918 |
| 1,271,101 | Taylor | July 2, 1918 |
| 1,934,039 | Conrad | Nov. 7, 1933 |